US010826811B1

(12) United States Patent
McAleer et al.

(10) Patent No.: US 10,826,811 B1
(45) Date of Patent: Nov. 3, 2020

(54) SYSTEM AND METHOD FOR MANAGING CLUSTERED RADIO NETWORKS

(71) Applicant: Dell Software Inc., Aliso Viejo, CA (US)

(72) Inventors: David McAleer, Toronto (CA); Kelly Noel Dyer, Toronto (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 608 days.

(21) Appl. No.: 14/178,158

(22) Filed: Feb. 11, 2014

(51) Int. Cl.
*H04L 12/26* (2006.01)

(52) U.S. Cl.
CPC ................... *H04L 43/10* (2013.01)

(58) Field of Classification Search
CPC ...................................... H04L 43/10
USPC ......................................... 709/224
See application file for complete search history.

(56) References Cited

U.S. PATENT DOCUMENTS

| 6,609,213 | B1* | 8/2003 | Nguyen ............. G06F 11/2025 709/223 |
| 7,738,374 | B2 | 6/2010 | Yagyu et al. |
| 8,259,635 | B2 | 9/2012 | Thubert et al. |
| 8,396,956 | B2 | 3/2013 | Thomson et al. |
| 2007/0288585 | A1* | 12/2007 | Sekiguchi ........... G06F 11/2038 709/209 |
| 2009/0049152 | A1 | 2/2009 | Rimhagen et al. |
| 2009/0175208 | A1 | 7/2009 | Thubert et al. |
| 2009/0190541 | A1* | 7/2009 | Abedi .................. H04W 16/10 370/329 |

FOREIGN PATENT DOCUMENTS

WO    WO-2002008444 A2    1/2002

OTHER PUBLICATIONS

Siwoo Byun, Moonhaeng Hur, "An index management using CHC-cluster for flash memory databases", Dec. 7, 2008, The journal of Systems and Software 82 (2009) 825-835.*
A.K. Jain, M.N. Murty and P.J. Flynn, "Data Clustering: A Review", ACM Computing Surveys, vol. 31, No. 3, Sep. 1999.*

* cited by examiner

*Primary Examiner* — Umar Cheema
*Assistant Examiner* — John Fan
(74) *Attorney, Agent, or Firm* — Shackelford, Bowen, McKinley & Norton, LLP

(57) ABSTRACT

In one embodiment, a method includes, on a monitoring system, maintaining hot-cluster data. The hot-cluster data includes identification of at least one hot cluster. The at least one hot cluster includes at least one hot-cluster remote node and is served by two or more hot-cluster networking devices. The method further includes selecting a monitoring request and transmitting the monitoring request to the two or more hot-cluster networking devices as a passive request. Via the passive request, the two or more hot-cluster networking devices are instructed to: not forward the monitoring request to the at least one hot-cluster remote node until a control request is received from a communicably separate control system; and upon receipt of the control request, transmit the monitoring request and the control request to the at least one hot-cluster remote node together as a piggy-back request.

20 Claims, 8 Drawing Sheets

SYSTEM AND METHOD FOR MANAGING CLUSTERED RADIO NETWORKS

BACKGROUND

Technical Field

The present invention relates generally to network management and more particularly, but not by way of limitation, to systems and methods for managing clustered radio networks.

History of Related Art

Oftentimes, more than one wireless access point may provide network access to devices in a coverage area. This redundancy can be advantageous, for example, when the coverage area includes obstructions, such as geological formations, that can block some of the devices from accessing one or more of the access points. However, such redundancy can also introduce technical problems. For example, one way of communicating with a particular device in the coverage area is to send a request to all access points serving the coverage area, which access points then forward the request to the particular device. However, simultaneous requests from different access points towards the same device can cause radio collisions and data contention. In addition, a given system that is initiating the request may have no knowledge of the existence of the multiple access points, which can prevent it from communicating in the fashion described above.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed on a monitoring system. The method includes maintaining hot-cluster data in a data store. The hot-cluster data includes identification of at least one hot cluster. The at least one hot cluster includes at least one hot-cluster remote node and is served by two or more hot-cluster networking devices. The method further includes selecting a monitoring request for transmission to the at least one hot-cluster remote node. In addition, the method includes transmitting the monitoring request to the two or more hot-cluster networking devices as a passive request. Via the passive request, the two or more hot-cluster networking devices are instructed to: not forward the monitoring request to the at least one hot-cluster remote node until a control request intended for the at least one hot-cluster remote node is received from a communicably separate control system; and upon receipt of the control request, transmit the monitoring request and the control request to the at least one hot-cluster remote node together as a piggy-back request.

In one embodiment, an information handling system includes a processing unit, wherein the processing unit is operable to implement a method. The method includes maintaining hot-cluster data in a data store. The hot-cluster data includes identification of at least one hot cluster. The at least one hot cluster includes at least one hot-cluster remote node and is served by two or more hot-cluster networking devices. The method further includes selecting a monitoring request for transmission to the at least one hot-cluster remote node. In addition, the method includes transmitting the monitoring request to the two or more hot-cluster networking devices as a passive request. Via the passive request, the two or more hot-cluster networking devices are instructed to: not forward the monitoring request to the at least one hot-cluster remote node until a control request intended for the at least one hot-cluster remote node is received from a communicably separate control system; and upon receipt of the control request, transmit the monitoring request and the control request to the at least one hot-cluster remote node together as a piggy-back request.

In one embodiment, a computer-program product includes a non-transitory computer-usable medium having computer-readable program code embodied therein. The computer-readable program code is adapted to be executed to implement a method. The method includes maintaining hot-cluster data in a data store. The hot-cluster data includes identification of at least one hot cluster. The at least one hot cluster includes at least one hot-cluster remote node and is served by two or more hot-cluster networking devices. The method further includes selecting a monitoring request for transmission to the at least one hot-cluster remote node. In addition, the method includes transmitting the monitoring request to the two or more hot-cluster networking devices as a passive request. Via the passive request, the two or more hot-cluster networking devices are instructed to: not forward the monitoring request to the at least one hot-cluster remote node until a control request intended for the at least one hot-cluster remote node is received from a communicably separate control system; and upon receipt of the control request, transmit the monitoring request and the control request to the at least one hot-cluster remote node together as a piggy-back request.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
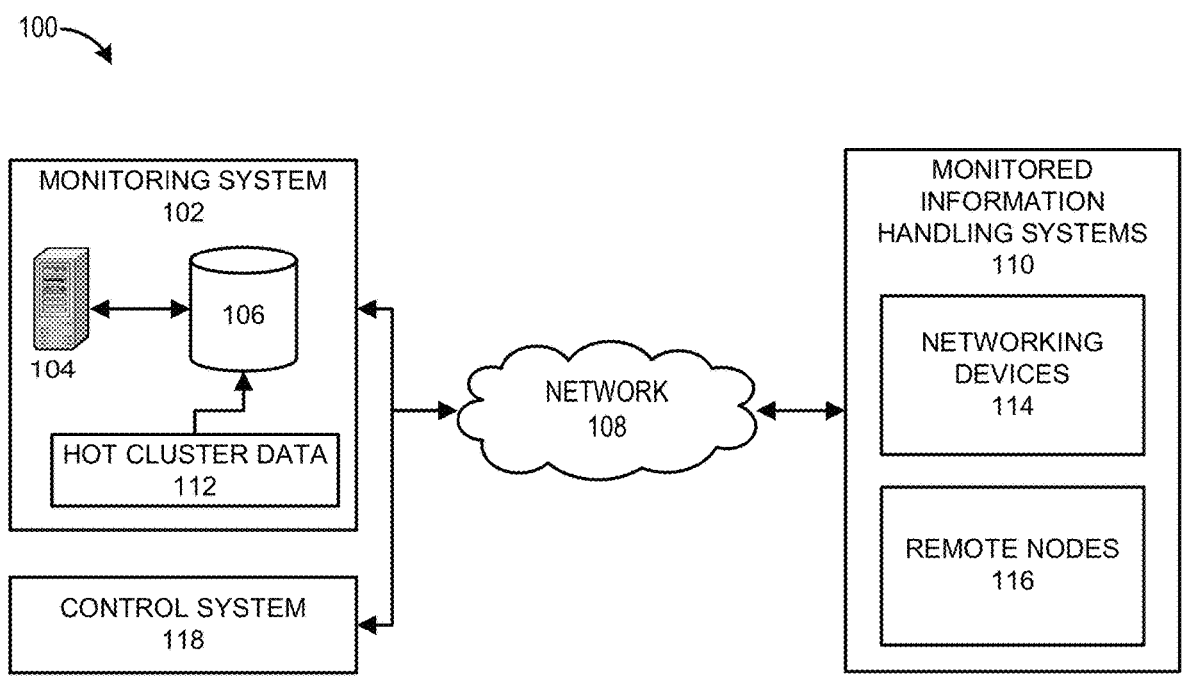
FIG. 1 illustrates a system for detecting and managing hot clusters.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

For purposes of this patent application, computer-networking devices, often referred to herein simply as networking devices, are information handling systems serving as networking equipment that, for example, route/forward traffic between two or more networks or subnetworks and/or provide access to a network. Computer-networking devices can include, for example, routers, switches, bridges, hubs, wireless access points, gateways, a combination of same, and/or the like. For purposes of this patent application, a remote node is an information handling system that is operable to connect to a computer-networking device via, for example, a wired or wireless connection. Remote nodes can include, for example, field devices (e.g., programmable logic controllers (PLCs)) that control or monitor local operations such as opening and closing valves and breakers, sensor systems, remote terminal units (RTUs) that connect to and gather data from sensor systems, and the like. Remote nodes can also include, for example, server computers, desktop computers, laptop computers, tablet computers, and smartphones.

In various embodiments, hot clusters can be better detected and managed utilizing systems described herein. For purposes of this patent application, a hot cluster describes a configuration of remote nodes such that more than one computer-networking device can be used to access the remote nodes. Stated somewhat differently, a hot cluster is typically designed so that multiple computer-networking devices provide redundant service to remote nodes located in a given coverage area. Hot clusters may be established, for example, to provide greater network availability, counteract obstructions or environmental conditions in the coverage area, and/or the like.

FIG. 1 illustrates a system 100 for detecting and managing hot clusters. The system 100 includes a monitoring system 102 and a control system 118 that are each operable to communicate over a communications network 108 with a plurality of monitored information handling systems 110. The monitored information handling systems 110 include networking devices 114 and remote nodes 116. In general, the monitoring system 102 and the control system 118 are communicably separate systems that can each issue commands to and/or glean information from or about the plurality of monitored information handling systems 110.

Although illustrated separately from the monitored information handling systems 110, in various embodiments, the monitoring system 102 and the control system 118 can each merely be representative of a network node that is not necessarily distinct from the monitored information handling systems 110. For purposes of clarity, commands or other messages originating from a monitoring system such as the monitoring system 102 will be referred to herein as monitoring requests. Commands or other messages originating from a control system such as the control system 118 will be referred to herein as control requests.

The monitoring system 102 is operable to periodically issue monitoring requests to the monitored information handling systems 110. In many cases, the monitoring requests may be directed to the remote nodes 116 through one or more of the networking devices 114. The monitoring requests may request certain data such as, for example, a status, a firmware version, a received signal strength indication (RSSI), a signal-to-noise ratio (SNR), etc. The monitored information handling systems 110, in turn, are operable to provide the requested data. Collectively, the collected data can allow the monitoring system 102 to generate reports, alerts, etc.

The control system 118 typically monitors and controls the remote nodes 116, for example, for purposes of performing industrial processes. In that way, the control system 118 is operable to periodically issue control requests. For example, in various embodiments, the control system 118 can encompass an industrial control system such as, for example, a supervisory control and data acquisition (SCADA) system or a distributed control system (DCS).

It should be appreciated that the communications network 108 is intended to abstract a plurality of networks over which the monitoring system 102 may be operable to communicate. In particular, the communications network 108 logically represents all communication infrastructure for connecting the monitoring system 102 to each of the monitored information handling systems 110. The communications network 108 can include any number of wired and/or wireless communications networks such as, for example, public or private intranets, the Internet, public switched telephone networks (PSTNs), cellular networks, satellite communication, and the like. To the extent a particular information handling system of the monitored information handling systems 110 connects to the monitoring system 102 through others of the monitored information handling systems 110, for purposes of communication between the monitoring system 102 and the particular information handling system, the communications network 108 can be considered to include those other information handling systems.

In a typical embodiment, subsets of the monitored information handling systems 110 may be interconnected. Each interconnected subset may be arranged into a network topology that is hierarchical and directional. In this manner, some of the monitored information handling systems 110 may be effectively dependent upon others of the monitored information handling systems 110. The monitored information handling systems 110 may also be geographically dispersed on a global level.

In certain embodiments, many of the monitored information handling systems 110 can be organized into hot clusters. An example of a hot cluster will be described with respect to FIG. 2. In general, the control system 118 is closely coupled to a network configuration of the monitored information handling systems 110. As a consequence, the control system 118 usually has direct access to information about each hot cluster in place at a given time (i.e., hot-cluster information). For example, for each remote node of the remote nodes 116, the control system 118 can maintain an ordered list of those of the networking devices 114 that can be used to communicate with the remote node. For those of the remote nodes 116 that are organized in a hot cluster, the ordered list typically includes more than one of the networking devices 114.

The control system 118 can leverage its hot-cluster information to avoid collisions when communicating with the remote nodes 116. For example, when the control system 118 determines to send a control request to a particular remote node of the remote nodes 116, the control system 118 can send the control message through a first networking device in a corresponding ordered list for the particular remote node. If that control request fails (e.g., after timeout), the control system 118 can attempt to send the control request through a second networking device in the corresponding ordered list. In a typical embodiment, the control system 118 sends control requests through only one of the networking devices 114 at a given time in order to avoid, for example, radio collisions. The control system 118 can iterate through each networking device on the corresponding list in succession until the control request is successful.

In a typical embodiment, information equivalent to the above-described hot-cluster information is not available to the monitoring system 102. In a typical embodiment, neither the control system 118, nor any other system, explicitly identifies hot clusters to the monitoring system 102. Rather, in a typical embodiment, the monitoring system 102 is operable to infer, and independently develop, hot-cluster data 112. The hot-cluster data 112 can be stored, for example, in a data store 106. The data store 106 can be representative, for example, of a database, flat file, and/or the like.

The hot-cluster data 112 can be similar in type to the hot-cluster information maintained by the control system 118 but is typically developed somewhat differently. In a typical embodiment, the hot-cluster information maintained by the control system 118 is developed based on direct access to information about how the monitored information handling systems 110 are structured. The hot-cluster data 112, in contrast, is typically developed indirectly by the monitoring system 102, for example, by observing how monitoring requests are handled by the monitored information handling systems 110 and drawing inferences therefrom. Examples of how the hot-cluster data 112 can be inferred will be described with respect to FIGS. 3-4.

In a typical embodiment, the hot-cluster data 112 can also be leveraged by the monitoring system 102 to provide improved management of those of the remote nodes 116 that are members of a hot cluster. For instance, the hot-cluster data 112 can be used to further reduce a risk of collisions in the hot-cluster context. Examples of the improved management will be described with respect to FIGS. 5A-6C.

Figure 2:
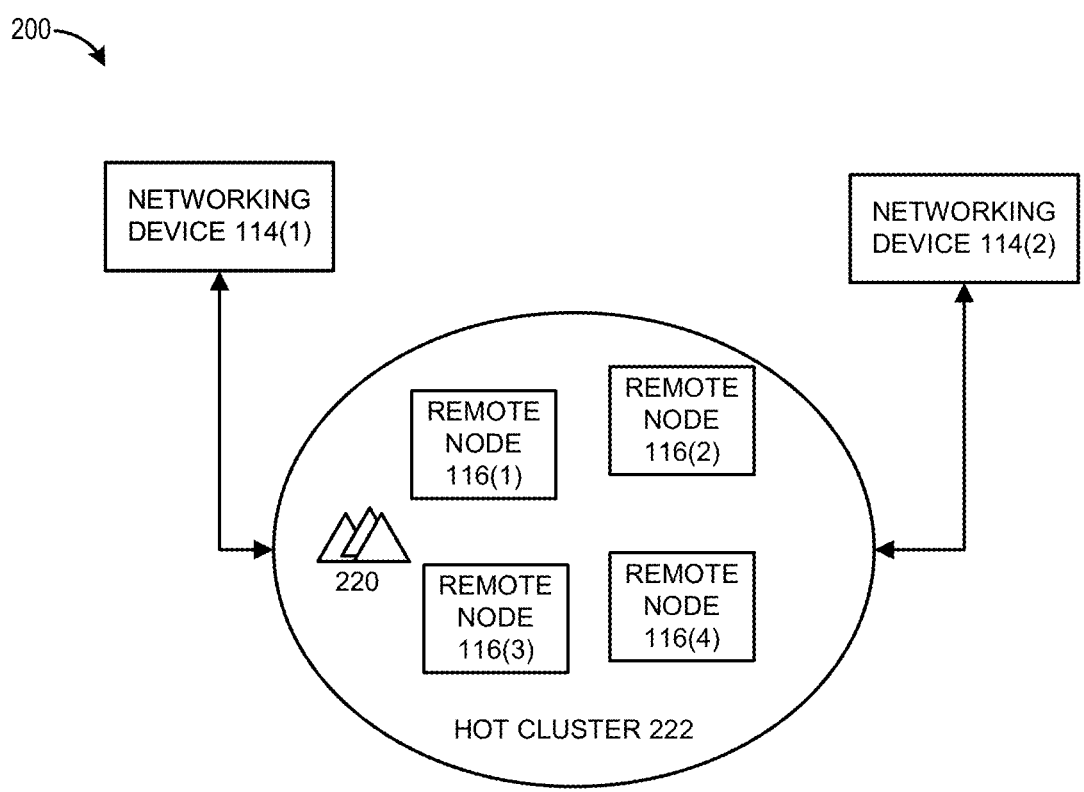
FIG. 2 illustrates an example of a hot cluster.

FIG. 2 illustrates an example of a hot cluster 222. The hot cluster 222 includes remote nodes 116(1), 116(2), 116(3), and 116(4) (collectively, remote nodes 116(1)-(4)) and is redundantly served by a networking device 114(1) and a networking device 114(2). The remote nodes 116(1)-(4) are part of the remote nodes 116 of FIG. 1. The networking devices 114(1) and 114(2) are part of the networking devices 114 of FIG. 1. FIG. 2 depicts obstructions 220 as an illustrative example of why the hot cluster 222 can be beneficial. The redundant network access provided by the networking device 114(1) and the networking device 114(2) can serve to provide multiple avenues for network access for any of the remote nodes 116(1)-(4) that are adversely affected by the obstructions 220.

Figure 3:
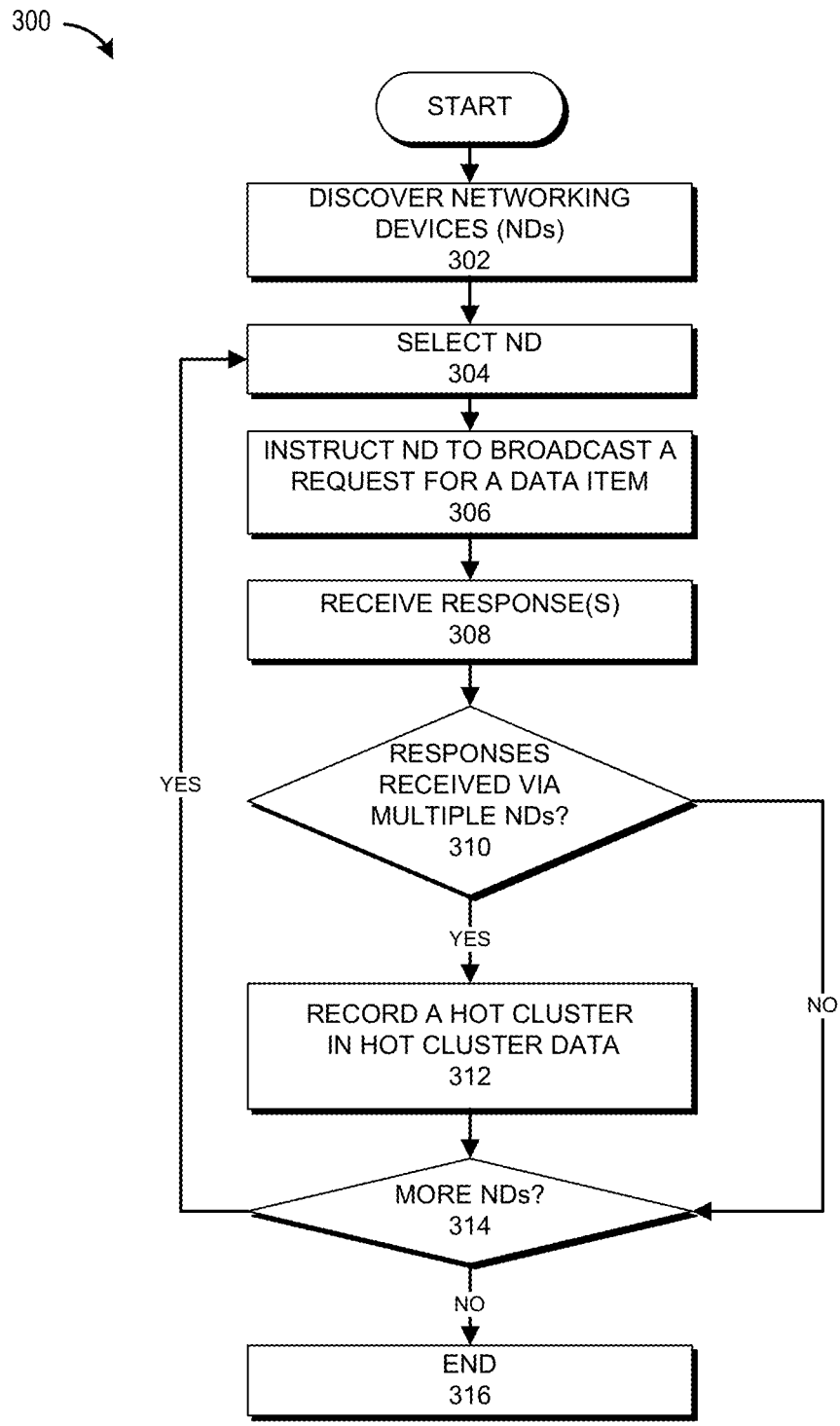
FIG. 3 illustrates a process for discovering hot clusters.

FIG. 3 illustrates a process 300 for discovering hot clusters. The process 300 can be implemented by any system that can access one or more data sources. For example, the process 300, in whole or in part, can be implemented by one or more of the monitoring system 102, the control system 118, any of the networking devices 114, and/or any of the remote nodes 116. The process 300 can also be performed generally by the system 100. Although any number of systems, in whole or in part, can implement the process 300, to simplify discussion, the process 300 will be described in relation to specific components of the system 100 as described in FIGS. 1-2.

At block 302, the monitoring system 102 discovers the networking devices 114. The block 302 can include, for example, the monitoring system 102 pinging all networking devices in a certain IP range (e.g., an IP range specified by an administrator). The block 302 can further include, for each pinged network device, attempting a connection to the pinged networking device, requesting certain information, and receiving the requested information.

At block 304, the monitoring system 102 selects a networking device from among the networking devices 114. In general, blocks 304-312 of the process 300 individually iterate through each of the networking devices 114. For example, in some embodiments, the blocks 304-312 can iterate through each of the networking devices 114 a single time. According to these embodiments, the selected networking device is a networking device that has not been selected in previous iterations of the block 304, if any. The selection can be made randomly, in an ordered fashion, and/or the like.

At block 306, the monitoring system 102 instructs the selected networking device to broadcast a request for a data item. In general, the selected networking device's coverage area will serve at least a subset of the remote nodes 116. The requested data item can be any information that the remote nodes 116 are operable to provide such as, for example, a status, a firmware version, a received signal strength indication (RSSI), a signal-to-noise ratio (SNR), and/or other information. At block 308, the monitoring system 102 receives responses to the request from the selected networking device. The selected networking device typically forwards to the monitoring system 102 each response it receives. Those of the remote nodes 116 for which the monitoring system 102 receives responses may be referred to herein as respondent remote nodes.

At decision block 310, the monitoring system 102 determines whether any of the respondent remote nodes have previously provided responses via another of the networking devices 114. Such previous responses may have been received during a previous iteration of blocks 304-312 when, for example, different networking devices were selected at the block 304. If the monitoring system 102 determines that at least one of the respondent remote nodes has previously provided a response via another of the networking devices 114, the process 300 proceeds to block 312. Otherwise, the process 300 proceeds to block 314 without recording any new hot-cluster data.

At block 312, the monitoring system 102 records a hot cluster in the hot-cluster data 112. The hot cluster can be considered to be redundantly served by the selected networking device and each other networking device through which the monitoring system 102 has received responses from any of the respondent remote nodes. The hot cluster can be considered to include the respondent remote nodes for the selected networking device as well as corresponding respondent remote nodes for each other networking device of the hot cluster. In some cases, the monitoring system 102 may already be partially aware of the hot cluster. For example, the monitoring system 102 may already know of two networking devices that serve the hot cluster and, as a result of the block 310, learn that the hot cluster is additionally served by the selected networking device. In such cases, the recordation at the block 312 may encompass updating the hot-cluster data 112 to so indicate.

At decision block 314, the monitoring system 102 determines whether there are any additional networking devices of the networking devices 114 through which blocks 304-312 of the process 300 have not yet iterated. If so, the process 300 returns to block 304 for selection of another networking device. Otherwise, the process 300 proceeds to block 316 and ends.

Figure 4:
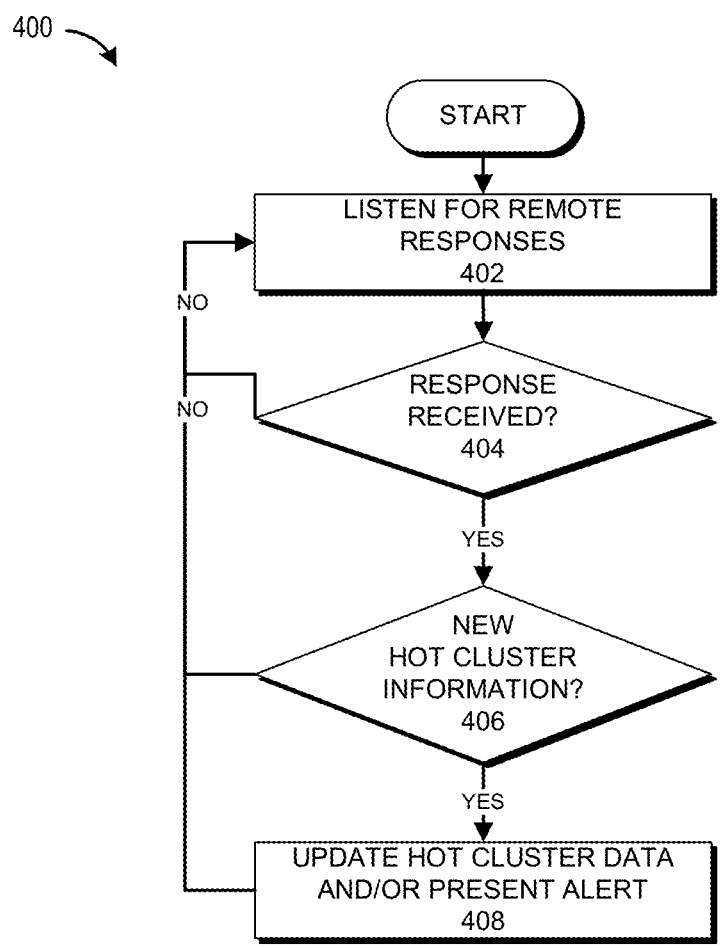
FIG. 4 illustrates a process for updating hot-cluster data.

FIG. 4 illustrates a process 400 for updating hot-cluster data. In some embodiments, the process 400 may be performed after a process such as the process 300 of FIG. 3. The process 400 can be implemented by any system that can access one or more data sources. For example, the process 400, in whole or in part, can be implemented by one or more of the monitoring system 102, the control system 118, any of the networking devices 114, and/or any of the remote nodes 116. The process 400 can also be performed generally by the system 100. Although any number of systems, in whole or in part, can implement the process 400, to simplify discussion, the process 400 will be described in relation to specific components of the system 100 as described in FIGS. 1-2.

At block 402, the monitoring system 102 listens for responses from the remote nodes 116. For example, the monitoring system 102 can listen for responses to monitoring requests. Such monitoring requests can be transmitted by the monitoring system 102 on-demand, as part of a data-collection schedule, etc. At decision block 404, the monitoring system 102 determines whether a response has been received. If so, the process 400 proceeds to decision block 406. Otherwise, the process 400 returns to block 402 so that the monitoring system 102 can continue to listen for responses from the remote nodes 116.

At decision block 406, the monitoring system 102 determines whether the response is indicative of new hot-cluster information. In general, new hot-cluster information can be any information that merits a change to hot-cluster data such as the hot-cluster data 112. For example, the response may allow the monitoring system 102 to infer a new hot cluster. On an ongoing basis, the monitoring system 102 typically records which networking device of the networking devices 114 forwards each response from the remote nodes 116. If the response is received via a networking device of the networking devices 114 that has not previously forwarded responses from the particular remote node (i.e., a different networking device), the monitoring system 102 may detect a new hot cluster. In such cases, each networking device via which responses have been received from the particular remote node, including the different networking device, can be considered to serve the new hot cluster in the fashion described with respect to the blocks 310-312 of FIG. 3. It should be appreciated that, in some cases, the new hot cluster may subsume one or more smaller hot clusters that were previously detected.

In some cases, the response might not be indicative of a new hot cluster as described above. For example, the different networking device may be a result of a network operator moving the particular remote node to a different subnetwork. In such cases, one or more previously-used networking devices may no longer receive and forward responses from the particular remote node. In some embodiments, the monitoring system 102 can address this scenario by waiting a predetermined period of time for at least one of the previously-used networking devices to forward another response from the particular remote node. If none of the previously-used networking devices forwards another response from the particular remote node within the predetermined period of time, the monitoring system 102 can reverse whatever changes or updates are made based thereon (e.g., updates described below with respect to block 408).

If it is determined at the decision block 406 that the response is not indicative of new hot-cluster information, the process 400 returns to block 402 so that the monitoring system 102 can continue to listen for responses from the remote nodes 116 as described above. Otherwise, if it is determined at the decision block 406 that the response is indicative of new hot-cluster information, the process 400 proceeds to block 408. At block 408, the monitoring system 102 updates the hot-cluster data 112 in accordance with the inferences and detections described above with respect to the block 406. In some cases, the block 406 can include functionality similar to that described above with respect to the block 312 of FIG. 3. In some embodiments, instead of, or in addition to, updating the hot-cluster data 112, the monitoring system 102 can present an alert to a network operator. In some embodiments, the monitoring system 102 can further require authorization from the network operator, or another authorized individual, before making any updates to the hot-cluster data 112.

Figure 5A:
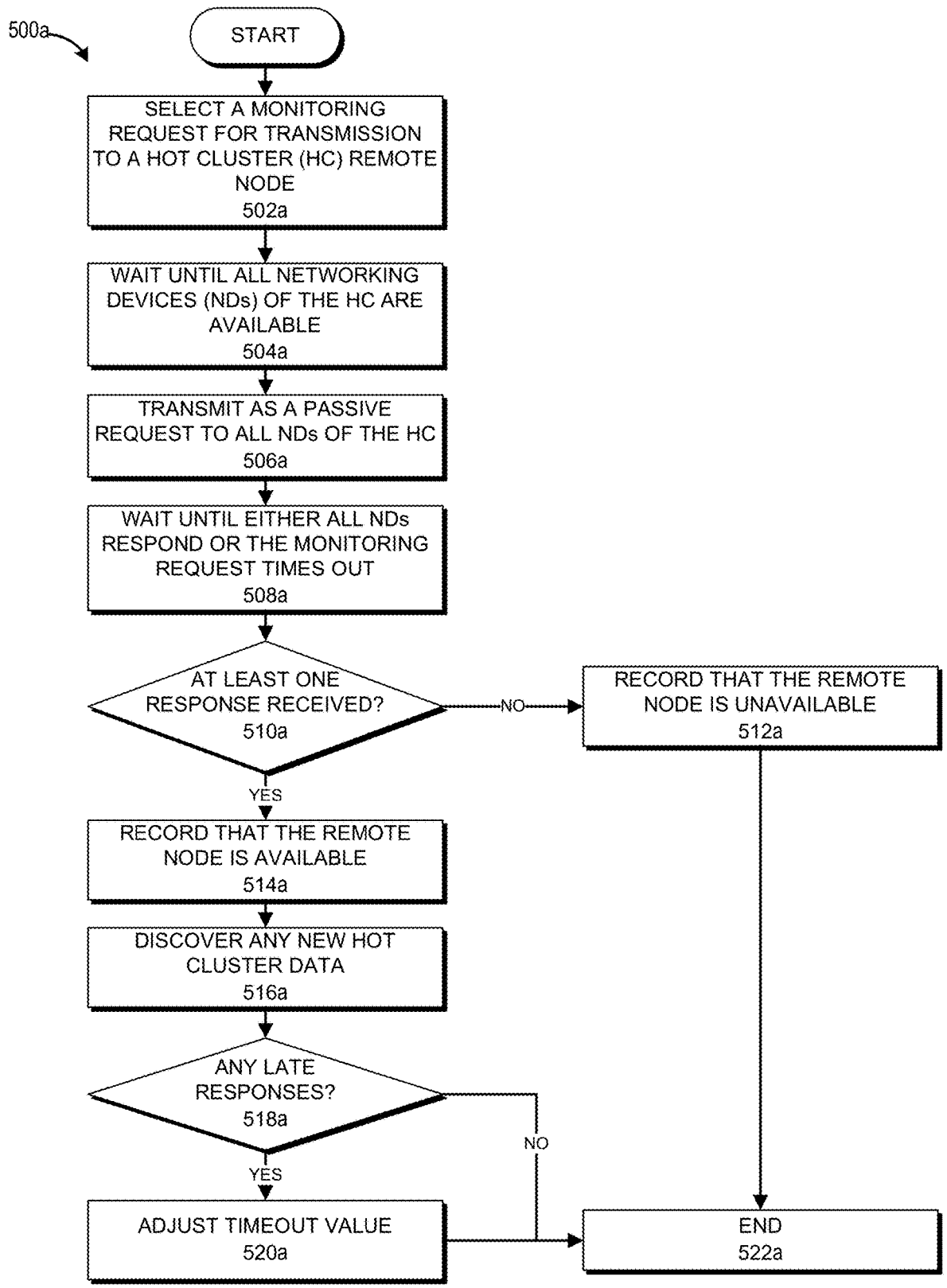
FIG. 5A illustrates a process for managing hot clusters.

FIG. 5A illustrates a process 500a for managing hot clusters. The process 500a can be implemented by any system that can access one or more data sources. For example, the process 500a, in whole or in part, can be implemented by one or more of the monitoring system 102, the control system 118, any of the networking devices 114, and/or any of the remote nodes 116. The process 500a can also be performed generally by the system 100. Although any number of systems, in whole or in part, can implement the process 500a, to simplify discussion, the process 500a will be described in relation to specific components of the system 100 as described in FIGS. 1-2.

In particular, the process 500a describes communication with a hot-cluster remote node of a managed hot cluster that is redundantly served by two or more hot-cluster networking devices. The hot-cluster remote node can be, for example, one of the remote nodes 116 of FIG. 1. The hot-cluster networking devices can be, for example, part of the networking devices 114 of FIG. 1. The managed hot cluster can be detected, for example, as described with respect to FIGS. 3-4. In various embodiments, the process 500a can be performed any time a monitoring request needs to be sent to a remote node that is a member of a hot cluster.

At block 502a, the monitoring system 102 selects a monitoring request for transmission to the hot-cluster remote node. In a typical embodiment, the monitoring system 102 maintains, for example, a queue of monitoring requests for each of the remote nodes 116. Therefore, the selected monitoring request can be, for example, a monitoring request that is on top of the queue for the hot-cluster remote node. At block 504a, the monitoring system 102 waits until all of the hot-cluster networking devices are available to receive transmissions. For example, in various embodiments, the monitoring system 102 may ensure that all of the hot-cluster devices are online, not in a power-saving mode, and/or the like.

At block 506a, the monitoring system 102 transmits the selected monitoring request to all of the hot-cluster networking devices as a passive request. For purposes of this patent application, a passive request refers to a request that is subject to one or more conditions before being transmitted to its intended destination. In a typical embodiment, the monitoring system 102 instructs the hot-cluster networking devices not to forward the monitoring request to the hot-cluster remote node unless and until a control request intended for the hot-cluster remote node is received from the control system 118. When a control request intended for the hot-cluster remote node is received, the hot-cluster networking devices can be instructed to transmit the control request and the monitoring request together as a piggy-back request. The piggy-back request can be, for example, two requests sent in succession in any order, a single request encapsulating both the monitoring request and the control request, and/or the like. In various embodiments, all of the networking devices 114 can be pre-instructed in the fashion described above. In other embodiments, such instructions can be included in the passive request, can accompany the passive request, etc. Exemplary handling of the passive request by the hot-cluster networking devices will be described in relation to FIG. 5B.

In a typical embodiment, the utilization of passive requests and piggy-back requests by the monitoring system 102 can reduce a risk of data collisions in the managed hot cluster. As noted above, the control system 118 can minimize a risk of radio collisions in a hot-cluster context by sending control requests one-at-a-time to networking devices in an ordered list until success is attained. In a typical embodiment, the monitoring system 102 can realize similar benefits without any knowledge of the ordered list maintained by the control system 118. In this manner, the monitoring system 102 minimizes transmissions from the hot-cluster networking devices to the hot-cluster remote node and/or to any other remote node of the remote nodes 116.

At block 508a, the monitoring system 102 waits until either a response to the monitoring request has been received via all of the hot-cluster networking devices or the monitoring request has timed out. In various embodiments, the monitoring request can be determined to timeout a configurable amount of time after the transmission at block 506a. The configurable amount of time can be expressed as a timeout value that is maintained by the monitoring system 102. In various embodiments, the timeout value can be a global value across the system 100, a value used across all hot clusters of the system 100, a value tailored to the managed hot cluster, and/or the like.

At decision block 510a, the monitoring system 102 determines whether at least one response to the monitoring request has been received. If not, at the block 512a, the monitoring system records, for example, in the data store 106, that the hot-cluster remote node is unavailable. Otherwise, if it is determined at the decision block 510a that at least one response to the monitoring request has been received, at block 514a, the monitoring system 102 records, for example, in the data store 106, that the hot-cluster remote node is available. At block 516a, the monitoring system discovers any new hot-cluster data. For example, the block 516a can encompass performing a process similar to the process 400 of FIG. 4.

At decision block 518a, the monitoring system 102 determines whether any late responses to the monitoring request have been received, for example, after the monitoring request has timed out. If not, the process 500a ends at block 522a. Otherwise, if it is determined at the decision block 518a that at least one late response has been received, the monitoring system 102 can adjust the timeout value at block 520a. By way of example, the adjustment at the block 520a can include setting the timeout value to a time elapsed between transmission of the monitoring request and receipt of a latest response received. The timeout value can also be adjusted in other ways such as, for example, incrementally (e.g., by a certain amount or percentage), by a factor or fraction of the time elapsed, etc. After block 520a, the process 500a proceeds to block 522a and ends.

Figure 5B:
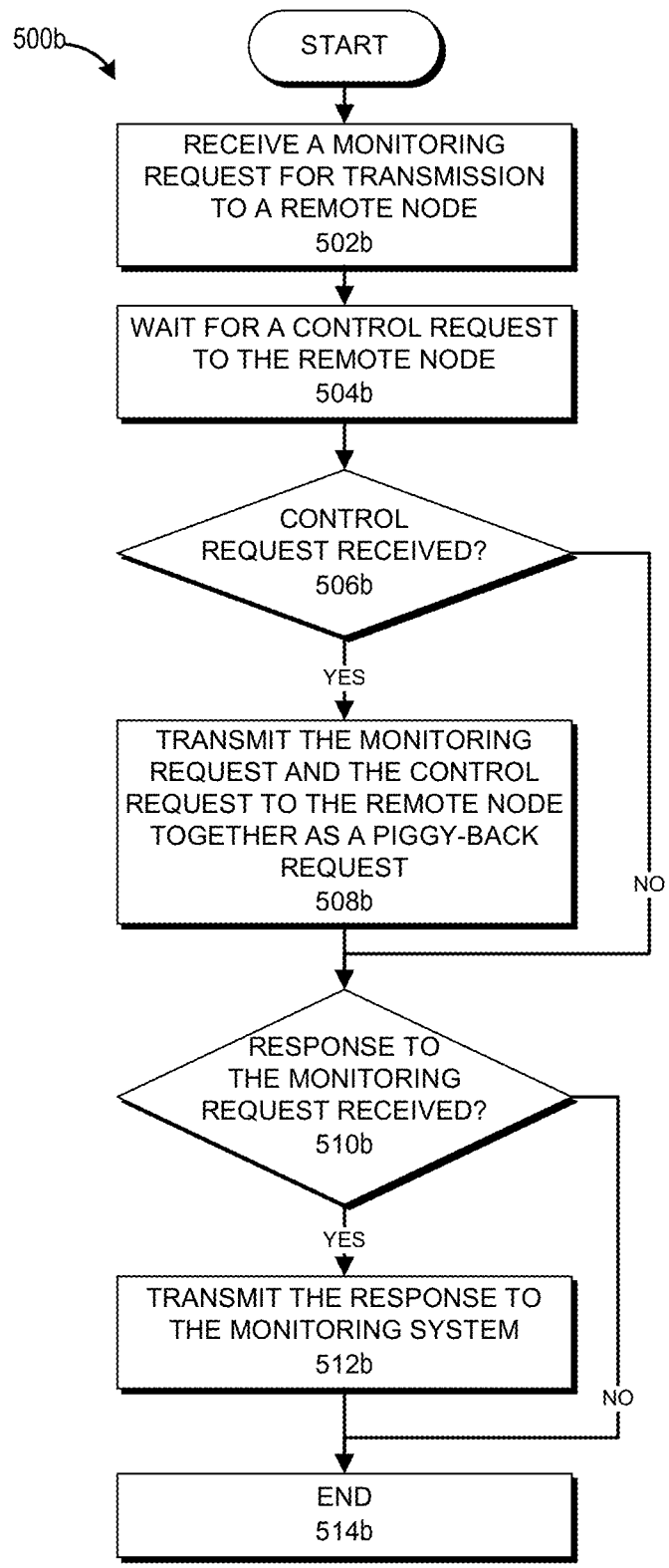
FIG. 5B illustrates a process for managing hot clusters.

FIG. 5B illustrates a process 500b for managing hot clusters. The process 500b can be implemented by any system that can access one or more data sources. For example, the process 500b, in whole or in part, can be implemented by one or more of the monitoring system 102, the control system 118, any of the networking devices 114, and/or any of the remote nodes 116. The process 500b can also be performed generally by the system 100. Although any number of systems, in whole or in part, can implement the process 500b, to simplify discussion, the process 500b will be described in relation to specific components of the system 100 as described in FIGS. 1-2.

In particular, the process 500b describes communication with a hot-cluster remote node of a managed hot cluster that is redundantly served by two or more hot-cluster networking devices. The hot-cluster remote node can be, for example, one of the remote nodes 116 of FIG. 1. The hot-cluster networking devices can be, for example, part of the networking devices 114 of FIG. 1. The managed hot cluster can be detected, for example, as described with respect to FIGS. 3-5A. In various embodiments, the process 500b can be performed by each of the hot-cluster networking devices during a process such as the process 500a of FIG. 5A. For purposes of simplicity, the process 500b will be described singly with respect to an illustrative hot-cluster networking device of the hot-cluster networking devices.

At block 502b, the illustrative hot-cluster networking device receives, from the monitoring system 102, a monitoring request directed to the hot-cluster remote node. In a typical embodiment, the monitoring request is transmitted by the monitoring system 102 as a passive request as described with respect to the block 506a of FIG. 5A. At block 504b, the illustrative hot-cluster networking device waits for a control request from the control system 118.

At decision block 506b, the illustrative hot-cluster networking device determines whether a control request has been received. In various embodiments, the illustrative hot-cluster networking device can determine that no control request has been received if, for example, no such control request is received within a certain period of time. It should be appreciated that the illustrative hot-cluster networking device typically receives responses to the monitoring request even if the monitoring request is transmitted to the hot-cluster remote mode via another hot-cluster networking device. Therefore, in various embodiments, the illustrative hot-cluster networking device can also determine that no control request has been received if, for example, no such control request has been received by the time that a response to the monitoring request has been received from the hot-cluster remote node.

If it is determined at the decision block 506b that no control request has been received, the process 500b proceeds to block 510b. In this situation, it can usually be assumed that the control system 118 has transmitted a control request to the hot-cluster remote node via another hot-cluster networking device. Otherwise, if it is determined at the decision block 506b that a control request has been received, the process 500b proceeds to block 508b. At block 508b, the hot-cluster networking device transmits the monitoring request and the control request to the hot-cluster remote node together as a piggy-back request.

At decision block 510b, the illustrative hot-cluster networking device determines whether a response to the monitoring request has been received. If not, the process 500b proceeds to the block 514b and ends. Otherwise, the process 500b proceeds to block 512b. At block 512b, the illustrative hot-cluster networking device transmits the response to the monitoring system 102. At block 514b, the process 500b ends.

Figure 6A:
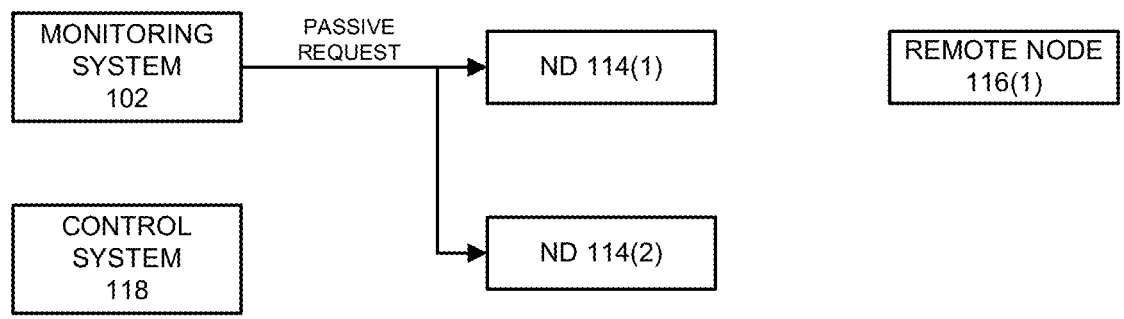
FIGS. 6A-6C illustrate an example of applying the processes of FIGS. 5A-5B.
Figure 6B:
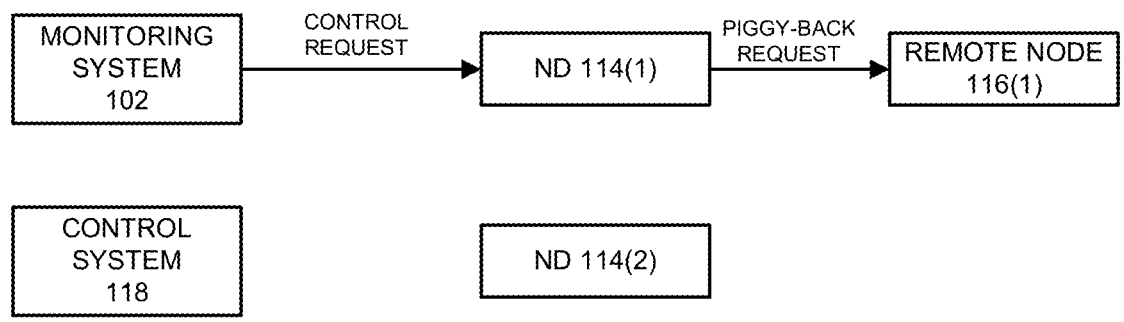
Figure 6C:
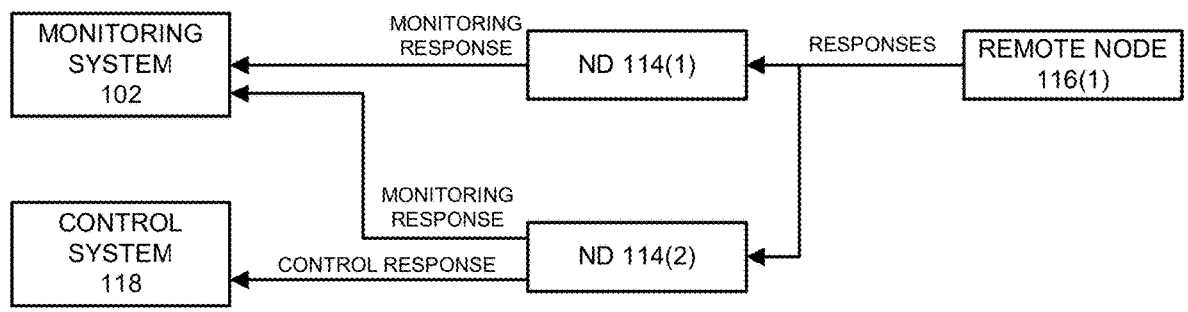

FIGS. 6A-6C illustrate an example of applying the processes described above with respect to FIGS. 5A-5B. For illustrative purposes, FIGS. 6A-6C will be described with respect to FIGS. 1-2. As illustrated in FIG. 6A, the monitoring system 102 transmits, as a passive request, a monitoring request to each networking device of the hot cluster 222 (i.e., the networking device 114(1) and the networking device 114(2)). For purposes of this example, the monitoring request is intended for the remote node 116(1).

As illustrated in FIG. 6B, the networking device 114(1) and the networking device 114(2) each wait for a control request to be received form the control system 118. For purposes of this example, the networking device 114(2) receives a control request. Subsequently, the networking device 114(2) transmits the monitoring request and the control request to the remote node 116(1) as a piggy-back request.

As illustrated in FIG. 6C, the remote node 116(1) transmits responses such as, for example, a response to the monitoring request and a response to the control request. Both the networking device 114(1) and the networking device 114(2) receive the responses. The networking device 114(1), as the device that received the control request, transmits the response to the control request to the control system 118. As depicted, both the networking device 114(1) and the networking device 114(2) transmit the monitoring response to the monitoring system 102.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   on a monitoring system comprising computer hardware, maintaining hot-cluster data in a data store, the hot-cluster data comprising identification of at least one hot cluster;
   wherein the at least one hot cluster comprises at least one remote node that is redundantly served by two or more wireless access points that are each in communication with the monitoring system;
   selecting, by the monitoring system, a monitoring request for transmission to the at least one remote node;
   transmitting, by the monitoring system, the monitoring request to the two or more wireless access points as a passive request such that the monitoring request is subject to one or more conditions before being transmitted to the at least one remote node; and
   wherein, pursuant to the passive request, the monitoring system instructs the two or more wireless access points to:
      not forward the monitoring request to the at least one remote node until a control request intended for the at least one remote node is received from a control system that is communicably separate from the monitoring system; and
      upon receipt of the control request from the communicably separate control system, transmit the monitoring request and the control request to the at least one remote node together as a piggy-back request.

2. The method of claim 1, wherein the maintaining comprises detecting the at least one hot cluster.

3. The method of claim 2, wherein the detecting comprises:
   discovering wireless access points;
   for each discovered wireless access point, instructing the discovered wireless access point to broadcast a request for a data item;
   via each of the two or more wireless access points, receiving a response to the monitoring request from the at least one remote node; and
   responsive to the receiving, recording the at least one hot cluster in the hot-cluster data.

4. The method of claim 2, wherein the detecting comprises:
   listening for responses from a plurality of remote nodes, the plurality of remote nodes comprising the at least one remote node; and
   responsive to receipt of a new response from the at least one remote node, determining whether the response is indicative of new hot-cluster information.

5. The method of claim 4, comprising, responsive to a determination that the new response is indicative of new hot-cluster information, performing at least one of the following:
   updating the hot-cluster data; and
   presenting an alert.

6. The method of claim 1, comprising receiving a response to the monitoring request.

7. The method of claim 1, comprising, before the transmitting, waiting until each of the two or more wireless access points is available.

8. The method of claim 1, comprising:
   responsive to no responses to the monitoring request being received, recording that the at least one remote node is unavailable; and
   responsive to at least one response to the monitoring request being received, recording that the at least one remote node is available.

9. The method of claim 8, comprising discovering new hot-cluster data via the at least one response.

10. The method of claim 1, comprising, responsive to receiving at least one late response to the monitoring request via at least one of the two or more wireless access points, adjusting a timeout value.

11. An information handling system comprising:
   a processor, wherein the processor is operable to implement a method comprising:

maintaining hot-cluster data in a data store, the hot-cluster data comprising identification of at least one hot cluster;

wherein the at least one hot cluster comprises at least one remote node that is redundantly served by two or more wireless access points that are each in communication with the information handling system;

selecting a monitoring request for transmission to the at least one remote node;

transmitting the monitoring request to the two or more wireless access points as a passive request such that the monitoring request is subject to one or more conditions before being transmitted to the at least one remote node; and wherein, pursuant to the passive request, the two or more wireless access points are instructed to:

not forward the monitoring request to the at least one remote node until a control request intended for the at least one remote node is received from a control system that is communicably separate from the information handling system; and upon receipt of the control request, transmit the monitoring request and the control request to the at least one remote node together as a piggy-back request.

12. The information handling system of claim 11, wherein the maintaining comprises detecting the at least one hot cluster.

13. The information handling system of claim 12, wherein the detecting comprises:

discovering wireless access points;

for each discovered wireless access point, instructing the discovered wireless access point to broadcast a request for a data item;

via each of the two or more wireless access points, receiving a response to the monitoring request from the at least one remote node; and responsive to the receiving, recording the at least one hot cluster in the hot-cluster data.

14. The information handling system of claim 12, wherein the detecting comprises:

listening for responses from a plurality of remote nodes, the plurality of remote nodes comprising the at least one remote node; and responsive to receipt of a new response from the at least one remote node, determining whether the response is indicative of new hot-cluster information.

15. The information handling system of claim 14, the method comprising, responsive to a determination that the new response is indicative of new hot-cluster information, performing at least one of the following:

updating the hot-cluster data; and presenting an alert.

16. The information handling system of claim 11, the method comprising, before the transmitting, waiting until each of the two or more wireless access points is available.

17. The information handling system of claim 11, the method comprising:

responsive to no responses to the monitoring request being received, recording that the at least one remote node is unavailable; and responsive to at least one response to the monitoring request being received, recording that the at least one remote node is available.

18. The information handling system of claim 17, the method comprising discovering new hot-cluster data via the at least one response.

19. The information handling system of claim 11, the method comprising, responsive to receiving at least one late response to the monitoring request via at least one of the two or more wireless access points, adjusting a timeout value.

20. A computer-program product comprising a non-transitory computer-usable medium having computer-readable program code embodied therein, the computer-readable program code adapted to be executed to implement a method comprising:

on a monitoring system comprising computer hardware, maintaining hot-cluster data in a data store, the hot-cluster data comprising identification of at least one hot cluster;

wherein the at least one hot cluster comprises at least one remote node that is redundantly served by two or more wireless access points that are each in communication with the monitoring system;

selecting, by the monitoring system, a monitoring request for transmission to the at least one remote node;

transmitting, by the monitoring system, the monitoring request to the two or more wireless access points as a passive request such that the monitoring request is subject to one or more conditions before being transmitted to the at least one remote node; and wherein, pursuant to the passive request, the monitoring system instructs the two or more wireless access points to:

not forward the monitoring request to the at least one remote node until a control request intended for the at least one remote node is received from a control system that is communicably separate from the monitoring system; and upon receipt of the control request from the communicably separate control system, transmit the monitoring request and the control request to the at least one remote node together as a piggy-back request.

* * * * *